United States Patent [19]

Howes et al.

[11] 3,734,426

[45] May 22, 1973

[54] TAPE TENSION CONTROL IN TAPE RECORDERS

[75] Inventors: Peter A. Howes, La Verne; Eugene A. Cooper, Placentia, both of Calif.

[73] Assignee: Bell & Howell Company, Chicago, Ill.

[22] Filed: Apr. 15, 1971

[21] Appl. No.: 134,172

[52] U.S. Cl...................242/190, 242/200, 274/11 D, 318/7

[51] Int. Cl......B65h 59/38, G03b 1/04, G11b 15/32

[58] Field of Search..............242/184, 189, 190–200, 242/75.44, 75.51; 318/6, 7; 274/4, 11

[56] References Cited

UNITED STATES PATENTS 3,488,696 1/1970 Klang ..................................242/190
3,497,154 2/1970 Lasarev et al. ....................242/75.44
3,478,985 11/1969 Tobey ................................242/184

*Primary Examiner*—Leonard D. Christian
*Attorney*—Luc P. Benoit

[57] ABSTRACT

Magnetic tape recorders, or other apparatus utilizing an information recording tape, include equipment for forming a length of the recording tape into a loop and for placing a portion of the loop in driving engagement with the capstan. The loop is tensioned during its formation and placement onto the capstan. The tape recorder may also include equipment for sensing the tape tension, for providing a signal indicative of the sensed tape tension, and for controlling the tape tension in response to the latter signal. Typically, a closed-loop servo system including the recording tape is provided. A feedback factor in this servo system may be modified to effect a desired tape tension at instances when the servo system operates in an open-loop mode.

32 Claims, 6 Drawing Figures

Patented May 22, 1973 3,734,426

3 Sheets-Sheet 1

INVENTORS:
PETER A. HOWES,
EUGENE A. COOPER
BY
ATTORNEY.

3 Sheets-Sheet 2

TAPE TENSION CONTROL IN TAPE RECORDERS

CROSS-REFERENCE

Subject matter herein shown is disclosed and claimed in the following patent application or patent which is assigned to the subject assignee and which herewith is incorporated by reference herein:

U.S. Pat. application Ser. No. 89,995, by Joseph J. Neff, filed Nov. 16, 1970.

BACKGROUND OF THE INVENTION

1. Field of the Invention

The subject invention relates to information recording and, more particularly, to magnetic tape recorders and to other apparatus utilizing an information recording tape.

2. Description of the Prior Art

The recording tape in prior-art tape recorders has a tendency to slip relative to the tape drive capstan. This is particularly the case if no nip or pinch roller is employed for pressing the tape against the capstan. Elimination of this type of roller is especially desirable in rapid high-quality tape recording equipment.

Tape slip could be avoided if tape tension on either side of the capstan could be equalized. This is difficult to accomplish with prior-art equipment in which the tape tension varies over a wide range as the radius of the tape supply and takeup coils change during operation of the tape recorder.

This description of the prior-art deals with only one situation in which the subject invention will provide a technological advance. Other instances in which the tape tension controls of the subject invention will be beneficial are apparent to those skilled in the art upon study of the subject disclosure.

SUMMARY OF THE INVENTION

The subject invention overcomes the above mentioned disadvantages and provides tension controls for apparatus utilizing an information recording tape.

From one aspect thereof, the subject invention is concerned with a magnetic tape recorder utilizing an information recording tape located in tape containing means and resides in the improvement comprising, in combination, tape drive means including a tape drive capstan spaced from said tape containing means and initially in spaced relationship to all of said recording tape located in tape containing means, means for moving said recording tape from said initial spaced relationship into engagement with said capstan, said moving means including means for forming a length of said recording tape into a loop and placing a portion of said loop into driving engagement with said capstan, means coupled to said recording tape for tensioning said loop during said movement of said recording tape from said initial spaced relationship into engagement with said capstan, means for sensing tape tension when said recording tape is in engagement with said tape drive capstan, means for providing a signal indicative of the sensed tape tension, and selectively actuable means connected to the signal providing means including at least part of said loop tensioning means for controlling tape tension in response to the signal.

In the subject disclosure, the expression "tape recorder" and expressions of like import are intended to refer not only to apparatus for reporting information, but also to equipment for playing back recorded information and to apparatus for performing alternatively recording and playback operations.

From another aspect thereof, the invention resides in a method of utilizing of a magnetic recording tape in a magnetic tape located in tape recorder and advanced by tape drive means including a tape drive capstan spaced from said tape containing means, and resides, more specifically, in the improvement comprising in combination the steps of moving said recording tape from said initial spaced relationship into engagement with said capstan, said movement of the recording tape including the steps of forming a length of said recording tape into a loop and placing a portion of said loop into driving engagement with said capstan, tensioning said tape loop during said movement of said recording tape from said initial spaced relationship into engagement with said capstan providing when said recording tape is in driving engagement with said capstan a closed-loop servo system extending through said recording tape, and controlling the tension of the recording tape with said closed-loop servo system.

From another aspect thereof, the subject invention is concerned with apparatus utilizing an information recording tape located in tape containing means, and resides in the improvement comprising, in combination, means for advancing the recording tape including a tape advance capstan for engaging and moving the recording tape said tape advance capstan being spaced from said tape containing means and initially in spaced relationship to all of said recording tape located in tape containing means means for moving said recording tape from said initial spaced relationship into engagement with said capstan, said moving means including means for forming a length of said recording tape into a loop and placing a portion of said loop into driving engagement with said capstan, means coupled to said recording tape for tensioning said loop during said movement of said recording tape from said initial spaced relationship into engagement with said capstan, means for guiding the recording tape in a tape advance path having a first leg and a second leg, with the capstan being located between the first and second legs, means for sensing tension of the recording tape in the first leg, means for providing a first signal indicative of the sensed tape tension in the first leg, selectively actuable means connected to the first signal providing means and including at least part of said loop tensioning means for controlling tape tension in the first leg of the tape advance path in response to the first signal, means for sensing tension of the recording tape in the second leg, means for providing a second signal indicative of the sensed tape tension in the second leg, and selectively actuable means connected to the second signal providing means and including at least part of said loop tensioning means for controlling tape tension in the second leg of the tape advance path in response to the second signal.

From another aspect thereof, the subject invention is concerned with apparatus utilizing an information recording tape extending from a first rotary tape retaining and winding device to a second rotary tape retaining and winding device said first and second rotary devices and said recording tape being located in tape containing means, and resides in the improvement comprising, in combination, means for advancing the recording tape including a tape advance capstan spaced from said tape containing means for engaging and moving the recording tape, means for moving said recording tape from said initial spaced relationship into engagement with said capstan, said moving means including means for forming a length of said recording tape into a loop and placing a portion of said loop into driving engagement with said capstan, means coupled to said recording tape for tensioning said loop during said movement of said recording tape from said initial spaced relationship into engagement with said capstan, said loop tensioning means including first means for rotating said first rotary device and second means for rotating said second rotary device, means for guiding the recording tape in a tape advance path having a first leg between the first rotary device and the capstan, and having a second leg between the second rotary device and the capstan, means for selectively energizing the first means for rotating said first rotary device, means for sensing tension of the recording tape in the first leg, means for providing a first signal indicative of the sensed tape tension in the first leg, and means connected to the signal providing means and to the selective energizing means for controlling the mentioned first means with the first signal.

From another aspect thereof, the subject invention is concerned with apparatus utilizing an information recording tape wound into a coil the diameter of which changes during utilization of the recording tape, and resides in the improvement comprising, in combination, means coupled to the recording tape for advancing the recording tape relative to the coil said advancing means including a capstan for engaging and moving said recording tape means coupled to the recording tape for maintaining substantially constant tape tension during the coil diameter changes, means for providing a substantially U-shaped tape advance path, means for locating said capstan at a bight portion of said substantially U-shaped tape advance path, means for forming tape from said coil into a substantially U-shaped loop and for placing a bight portion of said U-shaped loop about part of the periphery of said capstan, and means connected to said tape tension means for tensioning said tape during said formation and placement of said U-shaped loop.

From another aspect thereof, the subject invention is concerned with apparatus utilizing an information recording tape located in tape containing means, and resides in the improvement comprising, in combination, tape drive means including a tape drive capstan spaced from said tape containing means and initially in spaced relationship to all of said recording tape located in tape containing means, means for moving a length of the recording tape from the tape containing means and from said spaced relationship into engagement with the capstan, said moving means including means for forming said length of recording tape into a loop and placing a portion of said loop into driving engagement with said capstan, and means coupled to the recording tape for tensioning the length of recording tape during said formation and placement of the loop.

From another aspect thereof, the subject invention is concerned with apparatus utilizing an information recording tape, and resides in the improvement comprising, in combination, tape drive means including a tape drive capstan for engaging the recording tape, said capstan being initially in spaced relationship to all of said tape, means for moving said recording tape from said initial spaced relationship into engagement with said capstan, said moving means including means for forming a length of said recording tape into a loop and placing a portion of said loop into driving engagement with said capstan means for guiding the engaged recording tape from a first region toward the capstan, means for guiding the recording tape away from the capstan toward a second region, first tensioning means coupled to the recording tape for tensioning the recording tape in a direction away from the capstan and toward the first region, second tensioning means coupled to the recording tape for tensioning the recording tape in a direction away from the capstan and toward the second region means connected to said first and second tensioning means for tensioning said tape loop in a direction toward said first region and in a direction toward said second region during said formation and placement of said loop.

From yet another aspect thereof, the subject invention is concerned with apparatus utilizing an information recording tape located in tape containing means, and resides in the improvement, comprising, in combination, a tape drive capstan, means for selectively moving a length of the recording tape out of the tape containing means and into engagement with the capstan, and closed-loop tension control means including the recording tape for controlling the tension of the recording tape, with the tension control means including first feedback means and second feedback means and signal input means.

The apparatus under consideration further includes means for providing a first signal indicative of a desired tape tension, means for applying the first signal to the signal input means of the tension control means, selectively operable means for providing a second signal indicative of the actual tape tension, means for applying the second signal to the first feedback means, means selectively coupled to the moving means for modifying the second feedback means during the movement of the recording tape length, and means for selectively driving the tape drive capstan.

BRIEF DESCRIPTION OF THE DRAWINGS

The invention will become more readily apparent from the following detailed description of preferred embodiments thereof, illustrated by way of example in the accompanying drawings, in which.

Like reference numerals in the drawings designate like or functionally equivalent parts.

DESCRIPTION OF PREFERRED EMBODIMENTS

Figure 1:
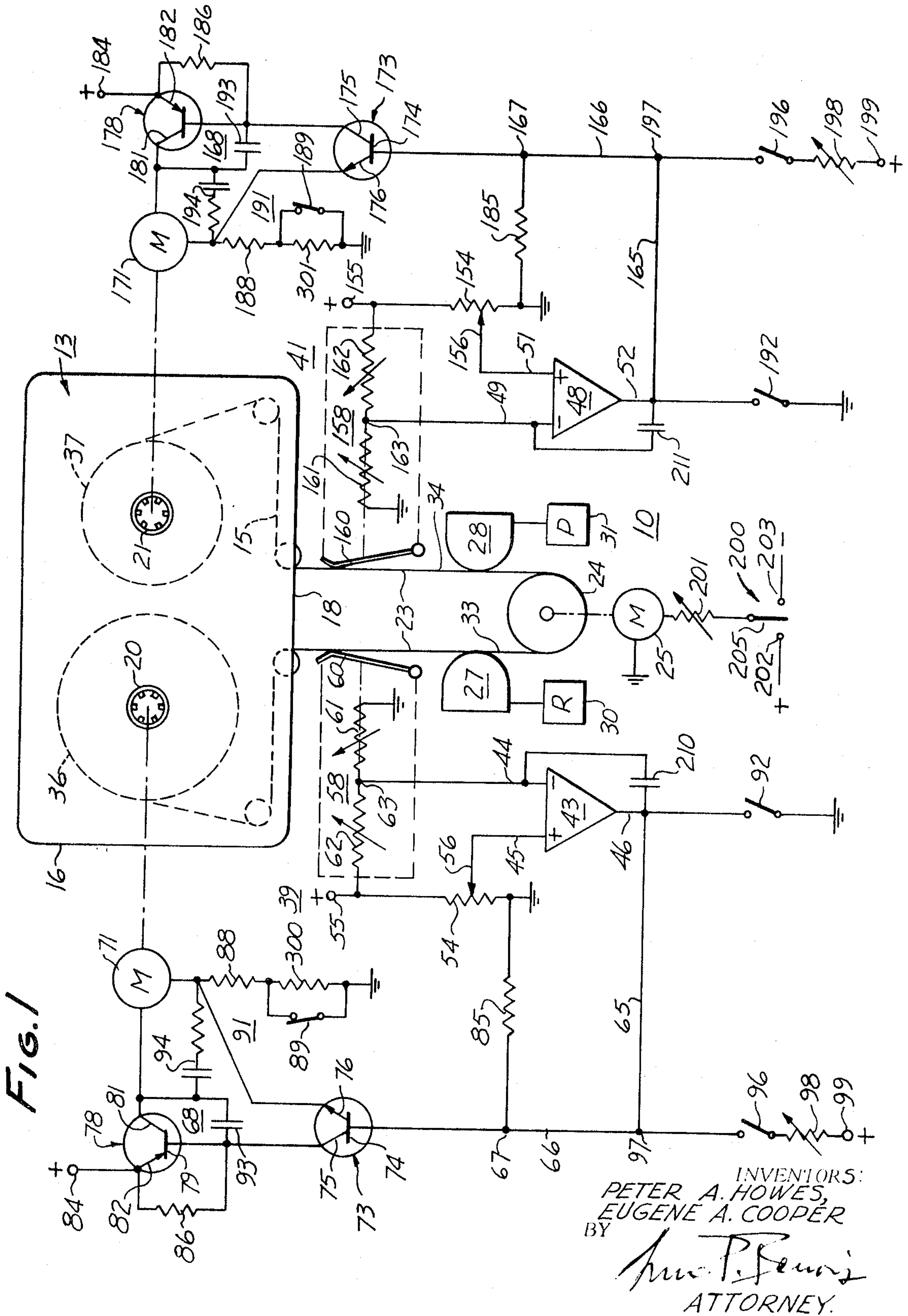
FIG. 1 is a circuit diagram of essential parts of a tape recorder in accordance with a preferred embodiment of the subject invention.

The tape recorder 10 shown in FIG. 1 typically operates with magnetic tape cassettes 13 of standard design.

Figure 2:
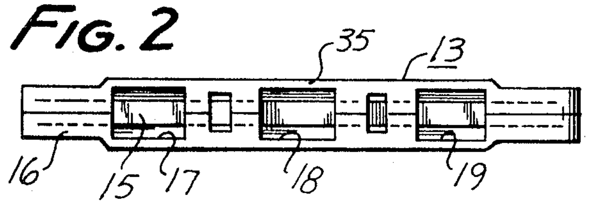
FIG. 2 is a front view of a tape cassette used in the apparatus of FIG. 1.
Figure 5:
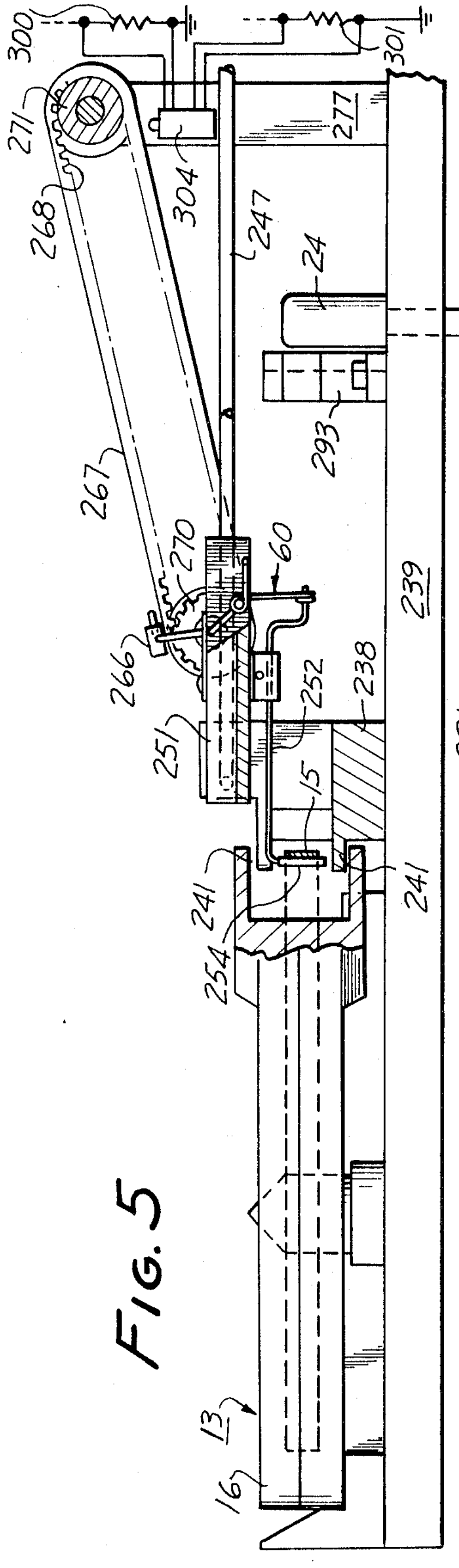
FIG. 5 is a side view of the apparatus shown in FIG. 3.

The tape cassette 13 has a magnetic recording tape 15 located in a casing 16. As seen in FIG. 2, the tape 15 passes from side to side through a number of windows 17, 18 and 19 which are provided in peripheral portions of the casing 16. The tape cassette 13 further includes a first hub or core 20 to which one end of the tape 15 is connected, and a second hub or core 21 to which the other end of the tape 15 is connected. The tape may be wound on either hub 20 and 21 by rotating the particular hub.

In the preferred embodiment illustrated in FIG. 1, a length or loop of the tape 23 extends out of the window 18 and around a tape advance capstan 24 which is rotatably mounted at a distance from the cassette 13. Accordingly, when the capstan 24 is rotated by its drive 25, the recording tape 15 is advanced out of the cassette 13 and subsequently back into the cassette.

During its travel outside of the cassette 13, the recording tape 15 moves past recording and playback heads 27 and 28. These heads may include recording means, or playback means, or combined recording and playback means, as well as means for erasing recorded information. By way of example, if the tape 15 is a magnetic recording tape, then the head 27 may be a magnetic recording head that is energized by conventional information recording equipment 30. Similarly, the head 28 may be a magnetic playback head that is associated with conventional playback equipment 31. A conventional erasing head (not shown) may be associated with the recording head 27.

For the purpose of operational convenience and superior performance, no nip or pinch roller has been associated with the capstan 24. Accordingly, the capstan 24 drives the tape 15 by virtue of the friction of the tape 23 relative to the capstan 24.

Objectional slip will occur between the tape 15 and the capstan 24 if $$T_1/T_2 > e^{\mu\theta}$$

wherein:

$T_1$ is the tape tension in the leg 33 of the U-shaped tape guide path represented by the loop 23, $T_2$ is the tape tension in the leg 34 of the U-shaped tape guide path, $e$ is the base of the system of natural logarithms, $\mu$ is the coefficient of friction of the tape 15 relative to the capstan 24, $\theta$ is the wrapping angle of the tape 15 about the capstan 24.

The factor $\theta$ is given by the design of the particular recorder and is equal to $\pi$ in the illustrated embodiments. The coefficient of friction is a function of the materials employed for the capstan 24 and the tape 15. It is, therefore, important that the tape tensions be equalized in the legs 33 and 34. Unfortunately, these tape tensions vary in practical designs by a factor of three or more as the diameters of the tape coils 36 and 37 in the cassette 13 change during the operation of the recorder.

In accordance with the subject invention, closed-loop servo systems 39 and 41, which include the tape 15, are provided for controlling tape tension.

More specifically, the preferred embodiment of FIG. 1 includes a first closed-loop servo system 39 for controlling the tension of the tape 15 in the leg 33, and a second closed-loop servo system 41 for controlling the tension of the tape 15 in the leg 34 of the tape advance path represented by the loop 23.

The servo loop 39 comprises an operational amplifier 43 which has an inverting input 44, a non-inverting input 45 and an output 46. Similarly, the servo loop 41 comprises an operational amplifier 48 which has an inverting input 49, a non-inverting input 51, and an output 52. Operational amplifiers of the type shown at 43 and 48 are well known in the integrated circuit and applied electronics arts. The operational amplifiers 43 and 48 may be of a conventional type, such as, by way of example, the type 741 of Fairchild or the type MC1439 by Motorola.

A variable potentiometer 54 constitutes a means for providing, for the servo loop 39, a signal indicative of a desired tension of the tape 15 in the leg 33. To this effect, the potentiometer 54 is connected between a current supply terminal 55 and ground. The terminal 55 is energized from a conventional regulated source of electric potential (not shown). The potentiometer 54 has a wiper arm 56 connected to the non-inverting input 45 of the operational amplifier 43.

The servo loop 39 further includes a strain gauge 58 for providing at the inverting input 44 of the operational amplifier 43 a signal indicative of the actual tape tension in the leg 33. To this end, the gauge 58 has a sensor or feeler 60 which is biased against the tape 15 in the leg 33 and which is actuated by the tape in accordance with the tape tension prevailing in the leg 33. The tension sensor 60 acts on a pair of resistive strain gauge elements 61 and 62 which have identical temperature characteristics, but which are mutually opposed in terms of their response to strain variations imposed by the sensor or feeler 60. The strain gauge elements 61 and 62 are connected between the energizing terminal 55 and ground, and have a center tap 63 connected to the inverting input 44 of the amplifier 43.

The signal provided by the gauge 58 thus operates on the amplifier 43 as a negative feedback signal which tends to reduce the output signal provided by the operational amplifier 43 in response to a given setting of the variable potentiometer 54. The output signal provided by the operational amplifier 43 is applied by way of leads 65 and 66 to the input 67 of a power amplifier 68 which drives a motor 71. The motor 71, in turn, is coupled to the hub 20, and tends to rotate this hub in a clockwise direction as seen in FIG. 1, so that the tape 15 is tensioned in the leg 33 relative to the capstan 24.

The power amplifier 68 has a transistor 73 which has a base 74 connected to the power amplifier input terminal 67, and which further has a collector 75 and an emitter 76. It will be noted that the transistor 73 is of the NPN type.

The power amplifier 68 further includes a PNP transistor 78 which has a base 79 connected to the collector 75 of the transistor 73, and which further has a collector 81 and an emitter 82. The power amplifier 68 is energized from a terminal 84 which may be connected to the same power source (not shown) as the terminal 55.

A bias resistor 85 for the transistor base 74 is connected between the input terminal 67 and ground, and a bias resistor 86 for the transistor 78 is connected between the base 79 and the emitter 82.

The motor 71 may be of a conventional permanent-magnet type and is connected between the collector 81 of the transistor 78 and a resistor 88. The resistor 88 is grounded by a normally closed switch contact 89. The emitter 76 of the transistor 73 is connected to the top of the resistor 88 as seen from ground potential, so that the emitter 76 receives a bias corresponding to the current flowing through the motor 78. In this manner, a feedback loop or path 91 is provided for the power amplifier 68.

The motor 71 tensions the tape 15 in the leg 33 of the tape loop 23 when it rotates or attempts to rotate the hub 20 of the cassette 13. The resulting tension is picked up by the feeler 60 which accordingly actuates the strain gauge 58. The strain gauge 58, in turn, applies a corresponding negative feedback to the operational amplifier 43 which controls the power amplifier 68 and thus the motor 71. It will thus be recognized that a closed-loop servo system 39 which includes a length of the tape 15 is provided for controlling the tension of the tape in the leg 33. To stabilize the operation of the servo loop 39, a capacitor 93 is connected between the base 79 and collector 81 of the transistor 78. Similarly, a RC network 94 is connected across the motor 71. Further loop stabilization and band-width control may be obtained by applying to the power amplifier input 67 a bias in addition to the output signal of the operational amplifier 43. To this end, a selectively actuable switch 96 is connected to a junction 97 between the leads 65 and 66. The switch 96 is connected to a variable resistor 98 which, in turn, is connected to an energizing terminal 99. The terminal 99 may be connected to the same power source as the terminals 55 and 84.

If it is desired to stop the hub 29 of the cassette 13, the input 57 of the power amplifier 68 is grounded by closing a normally open switch 92.

It will be noted that the closed-loop servo system 41 of FIG. 1 has components which are identical to components of the servo system 39. To avoid a duplicate description, components in the loop 41 which are identical to corresponding components in the loop 39 have been designated by a reference numeral which is equal to the reference numeral of the corresponding component in the loop 39 elevated by 100.

It is thus seen that the servo loop 41 has a motor 171 which rotates or tends to rotate the hub 21 of the cassette 13 in such a sense that the tape 15 is tensioned in the leg 34 of the tape loop 23 relative to the capstan 24. The tension of the tape 15 in the leg 34 is picked up by the strain gauge 158 by way of the sensor or feeler 160. The sliding arm 156 of a potentiometer 154 applies to the non-inverting input 51 of the operational amplifier 48 a signal which is indicative of the desired tension of the tape 15 in the leg 43. The strain gauge 158, in turn, applies to the inverting input 49 of the amplifier 48 a negative feedback signal corresponding to the actual tension of the tape 15 in the leg 34. This produces an output signal of the operational amplifier 48 which controls the power amplifier 168 and thus the motor 171. Rotation of the hub 21 may be stopped by closing a normally open switch 192 which connects the input 167 of the power amplifier 168 to ground.

The capstan drive motor 25 may be of a conventional permanent-magnet type. The motor is energized through a polarity reversal switch 200 and a variable resistor 201. The switch 200 has a first stationary contact 202 connected to the positive terminal, and a stationary contact 203 connected to the negative terminal of a center-grounded source of electric power (not shown). The capstan 24 is driven in a first sense of rotation when the movable contact 205 of the switch 200 is brought into engagement with the stationary contact 202. Conversely, the capstan 24 is driven in the opposite sense of rotation when the movable contact 205 is brought into engagement with the contact 203. The rate of rotation of the capstan 24 may be varied by adjusting the resistor 201.

The servo loops 39 and 41 are active while the capstan 24 advances the tape 15 in either direction. As a first benefit, either servo loop 39 or 41 is capable of automatically winding tape that is advanced in the direction of the hubs 20 and 21, respectively. In this manner, rapid changes of the sense of rotation of the capstan 24 are readily accommodated and rapid changes in the direction of tape advance are thus rendered possible. In addition, the servo loops 39 and 41 in response to proper adjustment of the potentiometers 54 and 154 equalize the tension of the tape in the legs 33 and 34 relative to the capstan 24. Tape slippage relative to the capstan is thus avoided and optimum tape driving efficiency is thus realized. For further operational stability, an integrating capacitor 210 may be connected in the feedback path of the operational amplifier 43, and an integrating capacitor 211 may be connected in the feedback path of the operational amplifier 48.

The tape tensioning servo systems according to the subject invention are also ideally suited for combination with the tape handling and loop forming systems disclosed in the above mentioned Neff application or patent. By way of example, this is illustrated in FIGS. 3 to 6.

The apparatus of FIGS. 3 to 6 is capable of extracting tape 15 from the cassette 13. To this end the apparatus includes a block 238 attached to a base plate 239 of the recorder. The block 238 has projecting tape guide members 241. These members 241 project into the casing window 18 when the cassette is located in its place in the recorder and restrain the recording tape 15 against movements lateral to the direction of tape advance. The block 238 also mounts a pair of rotatable or stationary rollers 243 which serve to guide the recording tape 15 as it is being pulled out of the window 18, as well as after it has been so pulled out.

The block 238 also has a pair of pivots 244 and 245 for a substantially U-shaped track 247. A stop 249 may be provided on the base plate 239 as indicated in FIG. 1 to provide for a confinement of the downward movement of the free end of the track 247.

A carriage 251 is mounted on the track 247 for sliding movement therealong. The carriage 251 carries a pair of fingers 252 and 253 which have finger portions 254 and 255. These finger portions are formed of end portions of the wires which provide the fingers 252 and 253 and of sleeves of a conventional wear-resistant flexible material.

A bent piece of wire forms a finger actuator 257 which is pivotally mounted on the carriage 251 with the aid of a metal plate 258. The finger actuator 257 is connected by a wire spring 260 to the fingers 252 and 253.

The wire spring 260 has a bight portion 262 and a pair of legs 263 and 264. The leg 263 is connected to the finger 252, whilst the leg 264 is connected to the finger 253.

The illustrated wire spring 260 and arrangement of the fingers 252 and 253 and finger actuator 257 impart a bistable character to the actuation of the fingers 252 and 253. Accordingly, the finger portions 254 and 255 have a first position in which they extend substantially in parallel to an edge of the recording tape 15 (see FIG. 3), as well as a second position in which they extend substantially at right angles to a recording tape edge (see FIG. 5). The spring wire legs 263 and 264 are designed for lateral flexing, and the spring wire bight portion 262 is designed for torsional loading thereby providing for the above mentioned bistable actuation of the fingers between their positions.

A bracket 266 connects the finger actuator to an endless flexible belt 267. The endless belt 267 has teeth 268 at the inside thereof (see FIG. 5). The teeth 268 mesh with a pair of gear pulleys 270 and 271.

The pulley 270 is mounted adjacent the block 238, and thus in the vicinity of the cassette window 18, by a shaft 273 which extends through a pair of bearing blocks 274 and 275. The pulley 271, on the other hand, is rotatably mounted on a block 277 at a location which is beyond the capstan 24 as seen from the cassette window 18. The block 277 is higher than the block 274 so that the endless belt 267 ascends at an inclined angle as seen from the cassette window 18. The angle of inclination is such that the finger portions 254 and 255 with the extracted length of recording tape will clear the capstan 24 as the carriage 251 moves along the tracks 247 in a direction away from the cassette window 18.

The operation of the tape advancing and extracting apparatus 10 will now be considered. To this end it is assumed that the tape recorder 10 has a well 279 for receiving a tape cassette 13 (see FIG. 6). The well 279 may be closed by a cover 280 which is slidable in the direction of the arrow 281 to open the well 279, and which is slidable in a direction opposite to the direction of the arrow 281 for a closure of the well 279 by the cover 280.

Preparatory to the insertion of a cassette 13 into the well 279, the cover 280 is opened. This rotates a gear in a clockwise direction as seen in FIG. 1 by the action of a rack 284 connected to the cover 280 and a gear wheel 285 located between the rack 284 and the gear 283 and being in meshing relationship therewith. The gear 283 is located on the shaft 273 which drives the pulley 270. In this manner, the endless belt 267 is advanced so that the bracket 266 and bracket actuator 257 place the finger portions 254 and 255 in the position illustrated in FIG. 3 preparatory to the insertion of a cassette 13 into the well 279.

Figure 6:
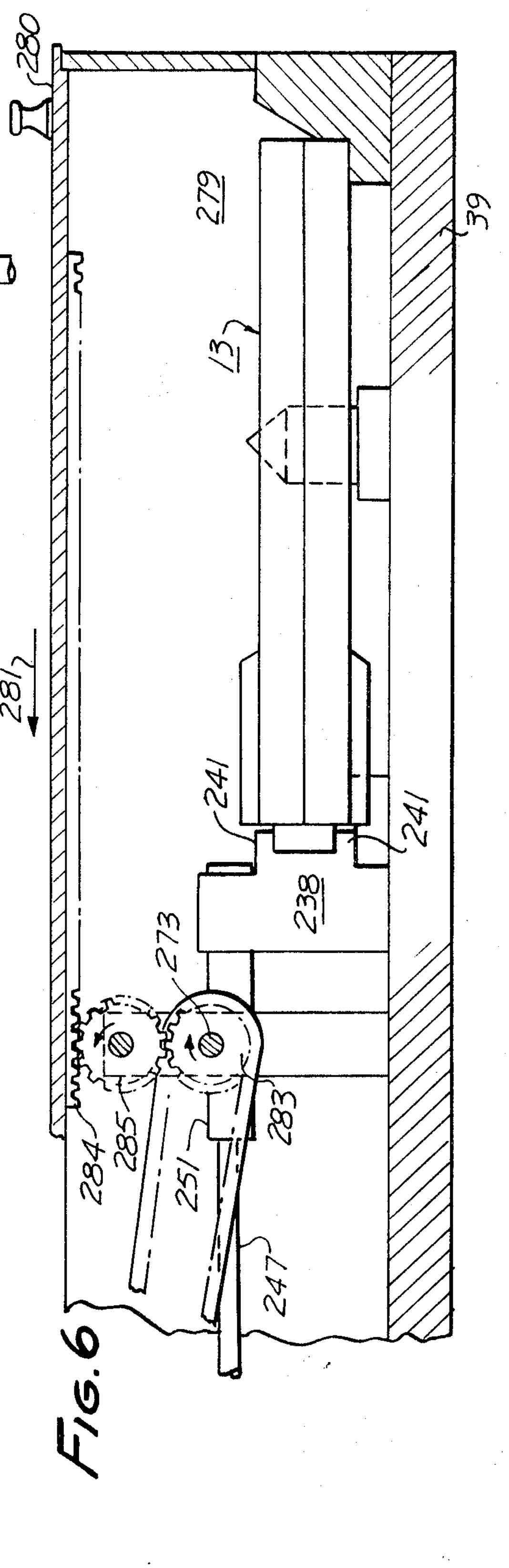
FIG. 6 is a side view of a modification of the apparatus of FIGS. 3 to 5.

The cassette 13 is then inserted whereby the upper edge of the tape 15 slides past and below the finger portions 254 and 255. The cover 280 is then closed which imparts a counter-clockwise rotation on the shaft 273 as seen in FIG. 6. This provides for such an advancement of the endless belt 267 that the bracket 266 is moved from the position shown in FIG. 3 to the advanced position shown in FIG. 5. As a result, the finger actuator 257 is rotated by 90°. This pushes the wire spring 260 downwardly whereby the finger portions 254 and 255 are rotated to their alternative position illustrated in FIG. 5.

In this alternative position, the finger portions 254 and 255 extend at right angles to the edges of the recording tape 15 and are located behind this recording tape as seen from the front opening of the cassette window 18. Accordingly, further advancement of the belt 267 through continued closing of the cover 280 causes a length of recording tape 23 to be pulled out of the cassette through the window 80 by the finger members 254 and 255.

Due to the above mentioned inclination of the endless belt 267, the finger portions 254 and 255 and the pulled-out tape length clear the capstan 24. The fingers 252 and 253 with portions 254 and 255 are thus capable of forming the pulled-out recording tape length into the substantially U-shaped loop 23.

The objective of the apparatus now is to place the bight portion of the U-shaped loop 23 about part of the periphery of the capstan 24. To this end, the advancement of the endless belt 267 is continued by continuing the closing motion of the cover 280. The bracket 266 on the belt 267 is thereby advanced about the upper pulley 271.

Figures 3, 4:
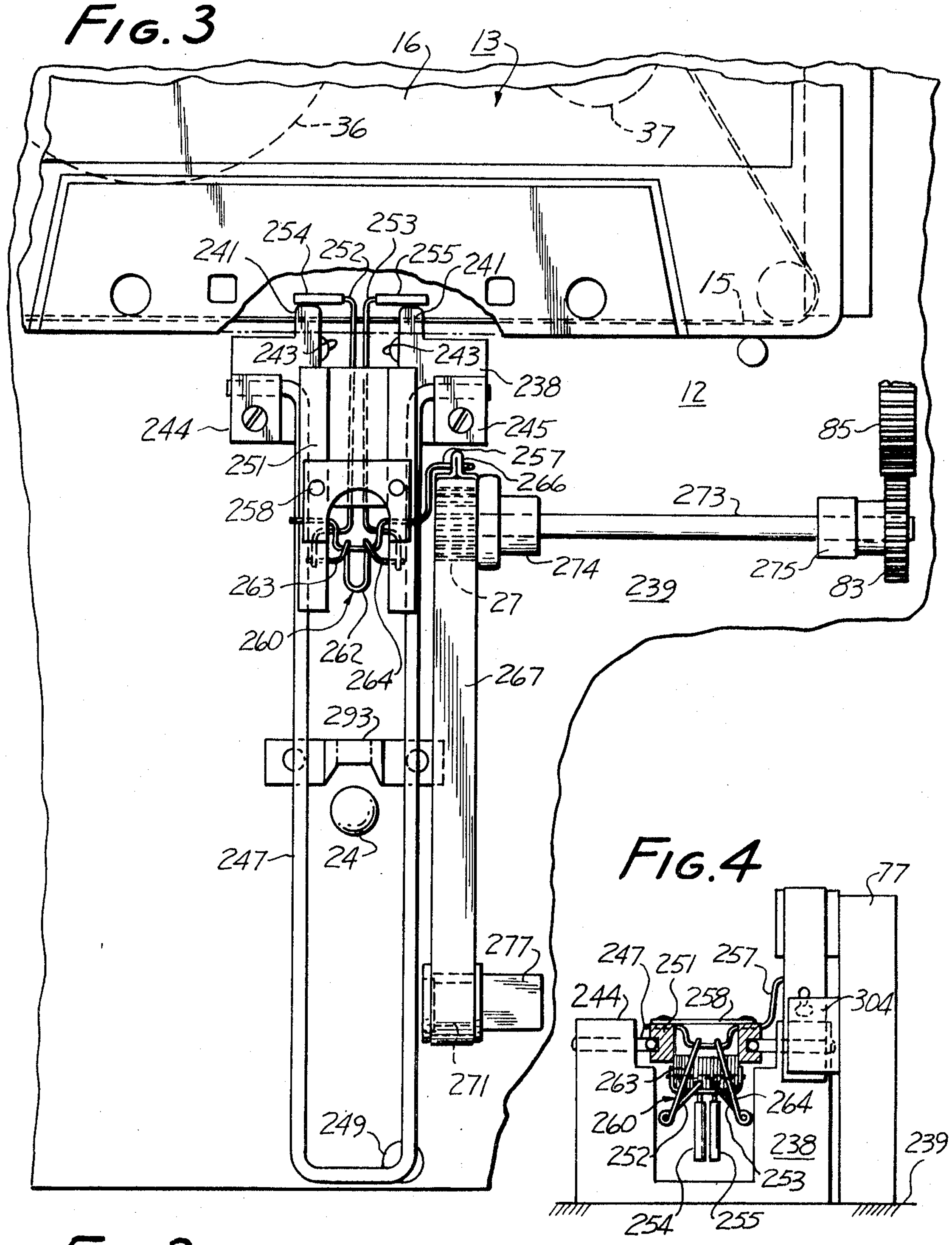
FIG. 3 is a top view of a modification of the apparatus of FIG. 1.
FIG. 4 is a rear view of a part of the apparatus of FIG. 3, with certain parts removed for a better view of the illustrated components.

In this manner, the finger portions 254 and 255 move laterally past the capstan 24 in the direction of a retention member 293. To better illustrate the resulting position of the finger portions 254 and 255, the capstan 24 and the recording tape 15 have not been shown in FIG. 4. It should, however, be understood that the finger members 254 and 255 move past the capstan 24 and into a cavity of the retention member 293. In consequence, the recording tape 15 is placed about part of the periphery of the capstan 24 so as to be in driving engagement with the capstan over an angle of some 180°. The tape 15 is then in the position shown in FIG. 1. It will be noted at this juncture that the servo loops 39 and 41 are open when the tape 15 is located in the cassette 13 as shown in FIG. 3, or during any other phase of the operation of the tape extractor when the tape is disengaged from the sensors 60 and 160. The open-loop servo system 39 and 41 are then only controlled by the position of the potentiometer wipers 56 and 156. In practice, this tends to lead to excessive tensioning of the tape 15 while the loop 23 is being formed.

To avoid damage to the tape 15, the feedback loops 91 and 191 in the power amplifiers 68 and 168 are modified during extraction of the tape from the cassette or return of the tape to the cassette. To this end, a resistor 300 is connected in series with the resistor 88 in the power amplifier 68. Similarly, a resistor 301 is connected in series with the resistor 188 in the power amplifier 168. When the contact switch 89 is opened, the resistor 300 becomes effective in series with the resistor 88 and the tension exerted on the tape 15 by the motor 71 is consequentially reduced. Similarly, when the switch contact 189 is opened, the resistor 301 becomes effective in series with the resistor 188 and the tension exerted on the tape 15 by the motor 171 is correspondingly diminished.

In the preferred embodiment shown in FIGS. 3 to 6, the contacts 89 and 189 are part of a microswitch 304 which is mounted on the post 277 in such a position as to be actuated by the bracket 266 when the same has been transported by the belt 267 to its upper extreme position. In that position of the bracket 266, the tape has been placed about the capstan 24 and the fingers 254 and 255 have been placed into the retaining member 293 as mentioned above.

The bracket 266 actuates the microswitch 304 so that the contacts 89 and 189 are closed, and the resistors 300 and 301 are rendered ineffective as long as the tape 15 is positioned about the capstan 24 in the manner shown in FIG. 1. However, when the tape is returned to the cassette, the bracket 266 moves away from the microswitch 304 and the contacts 89 and 189 are opened, thereby rendering the resistors 300 and 301 effective. In this manner, a tension is exerted on the loop 23 so as to move the extracted tape back into the cassette 13. Because of the then effective presence of the resistors 300 and 301, no excessive tension is exerted on the tape 15 when the same leaves the sensors 60 and 160 thereby removing the feedback signal from the inverting amplifier inputs 44 and 49.

Similarly, the contacts 89 and 189 are open and the resistor 300 and 301 are effective while the tape 15 is being extracted from the cassette in the above mentioned manner. The resulting tensioning of the tape effectively prevents a falling of the tape loop from the extraction fingers 254 and 255. If the extracted tape loop should, nevertheless, become accidentally disengaged from the extracting fingers 254 and 255 before the extracted tape loop has been placed about the capstan 24, then the tension exerted by the motors 71 and 171 will automatically return the disengaged tape loop to the cassette. As a result, a further tape extraction operation may readily be commenced in the above mentioned manner. Without the presence of the tape tension during the extracting operation, the lost tape loop would fall downwardly beyond the reach of the fingers 254 and 255 and a renewed tape extracting operation would thereby be rendered impossible.

After a length of tape has been positioned about the capstan 24, the tape may be advanced in either direction by suitable actuation of the switch 200, and at various speeds by suitable adjustment of the resistor 201. Information may then be recorded on the tape or played back from the tape with the aid of the heads 27 and 28 with associated equipment 30 and 31.

If it is desired to remove a cassette 13 from the recorder, the movable switch contact 205 is placed in its midposition so that the capstan drive motor 25 is deenergized. The cover 280 may then be opened by movement in the direction of the arrow 281. As a result, the belt 267 returns the bracket 266 to the position shown in FIG. 5 and the extracted tape loop is thereby returned to the inside of the casing 16 by action of the tension exerted on the tape by the motors 71 and 171. If the cover 280 is opened further, the belt 267 transports the brackets 266 into the position shown in FIG. 3 so that the fingers 254 and 255 are swung into a horizontal position. The cassette 13 can then be removed from the recorder and a new cassette can be inserted into the well 279 in its stead.

We claim:

1. In a magnetic tape recorder utilizing an information recording tape located in tape containing means, the improvement comprising in combination:

tape drive means including a tape drive capstan spaced from said tape containing means and initially in spaced relationship to all of said recording tape located in tape containing means;

means for moving said recording tape from said initial spaced relationship into engagement with said capstan, said moving means including means for forming a length of said recording tape into a loop and placing a portion of said loop into driving engagement with said capstan;

means coupled to said recording tape for tensioning said loop during said movement of said recording tape from said initial spaced relationship into engagement with said capstan;

means for sensing tape tension when said recording tape is in engagement with said tape drive capstan;

means for providing a signal indicative of said sensed tape tension; and selectively actuable means connected to said signal providing means and including at least part of said loop tensioning means for controlling tape tension in response to said signal.

2. A recorder as claimed in claim 1, wherein:

said means for providing said signal include means for providing a first signal indicative of a desired tape tension, means for providing a second signal indicative of said sensed tape tension, and means for providing an error signal in response to said first and second signals; and said means for controlling tape tension include means for controlling tape tension in response to said error signal.

3. A recorder as claimed in claim 1, wherein:

said means for sensing tape tension include strain transducer means.

4. A recorder as claimed in claim 1, wherein:

said means for providing said signal include means for providing a first signal indicative of a desired tape tension, means for providing a negative feedback signal corresponding to said sensed tape tension; and said means for controlling tape tension include means for controlling tape tension in response to said first signal and said negative feedback signal.

5. A recorder as claimed in claim 1, wherein:

said means for providing said signal include means for providing a first signal indicative of a desired tape tension, means for providing a second signal corresponding to said sensed tape tension, and amplifier means having first input means for receiving said first signal, negative feedback input means for receiving said second signal as a negative feedback signal, and means for providing an amplifier means output signal in response to said first and second signals; and said means for controlling tape tension include means for controlling tape tension in response to said output signal.

6. In a method of utilizing a magnetic recording tape located in tape containing means in a magnetic tape recorder and advanced by tape drive means including a tape drive capstan spaced from said tape containing means, the improvement comprising in combination the steps of:

providing initially all of said recording tape in spaced relationship to said drive capstan;

moving said recording tape from said initial spaced relationship into engagement with said capstan, said movement of the recording tape including the steps of forming a length of said recording tape into a loop and placing a portion of said loop into driving engagement with said capstan;

tensioning said tape loop during said movement of said recording tape from said initial spaced relationship into engagement with said capstan;

providing when said recording tape is in driving engagement with said capstan a closed-loop servo system extending through said recording tape; and controlling the tension of said recording tape with said closed-loop servo system.

7. A method as claimed in claim 6, including the steps of:

opening said closed-loop servo system and tensioning with said opened servo system said tape loop during said movement of said recording tape from said initial spaced relationship into engagement with said capstan.

8. A method as claimed in claim 7, including the steps of:

winding said recording tape into a coil;

extending said closed-loop servo system through said coil;

sensing the tension of said recording tape in said closed-loop servo system; and controlling said winding of said recording tape in said closed-loop servo system in accordance with said sensed tape tension.

9. A method as claimed in claim 6, including the steps of:

returning said tape from said capstan to said tape containing means and placing all of said tape into said spaced relationship to said drive capstan; and tensioning said tape during said return to said tape containing means.

10. In apparatus for utilizing an information recording tape located in tape containing means, the improvement comprising in combination:

means for advancing said recording tape including a tape advance capstan for engaging and moving said recording tape, said tape advance capstan being spaced from said tape containing means and initially in spaced relationship to all of said recording tape located in tape containing means;

means for moving said recording tape from said initial spaced relationship into engagement with said capstan, said moving means including means for forming a length of said recording tape into a loop and placing a portion of said loop into driving engagement with said capstan;

means coupled to said recording tape for tensioning said loop during said movement of said recording tape from said initial spaced relationship into engagement with said capstan;

means for guiding said recording tape in a tape advance path having a first leg and second leg, with said capstan being located between said first and second legs;

means for sensing tension of said recording tape in said first leg;

means for providing a first signal indicative of said sensed tape tension in said first leg;

selectively actuable means connected to said first signal providing means and including at least part of said loop tensioning means for controlling tape tension in said first leg of said tape advance path in response to said first signal;

means for sensing tension of said recording tape in said second leg;

means for providing a second signal indicative of said sensed tape tensions in said second leg; and selectively actuable means connected to said second signal providing means and including at least part of said loop tensioning means for controlling tape tension in said second leg of said tape advance path in response to said second signal.

11. An apparatus as claimed in claim 10, wherein:

said means for providing said first signal include means for providing a third signal corresponding to a desired tape tension in said first leg, means for providing a fourth signal corresponding to said sensed tape tension in said first leg, and means for deriving said first signal from said third and fourth signals; and said means for providing said second signal include means for providing a fifth signal corresponding to a desired tape tension in said second leg, means for providing a sixth signal corresponding to said sensed tape tension in said second leg, and means for deriving said second signal from said fifth and sixth signals.

12. An apparatus as claimed in claim 11, wherein:

said means for sensing tension of said recording tape in said first leg and said means for sensing tension of said recording tape in said second leg include strain transducer means.

13. In apparatus utilizing an information recording tape extending from a first rotary tape retaining and winding device to a second rotary tape retaining and winding device, said first and second rotary devices and said recording tape being located in tape containing means, the improvement comprising in combination:

means for advancing said recording tape including a tape advance capstan spaced from said tape containing means for engaging and moving said recording tape;

means for moving said recording tape from said initial spaced relationship into engagement with said capstan, said moving means including means for forming a length of said recording tape into a loop and placing a portion of said loop into driving engagement with said capstan;

means coupled to said recording tape for tensioning said loop during said movement of said recording tape from said initial spaced relationship into engagement with said capstan, said loop tensioning means including first means for rotating said first rotary device and second means for rotating said second rotary device;

means for guiding said recording tape in a tape advance path having a first leg between said first rotary device and said capstan, and having a second leg between said second rotary device and said capstan;

means for selectively energizing said first means for rotating said first rotary device;

means for sensing tension of said recording tape in said first leg;

means for providing a first signal indicative of said sensed tape tension in said first leg; and means connected to said signal providing means and to said selective energizing means for controlling said first means with said first signal.

14. An apparatus as claimed in claim 13, wherein:

said means for providing said first signal include means for providing a signal indicative of a desired tension of said recording tape in said first leg, means for providing a signal corresponding to said sensed tension of said recording tape in said first leg, and means for deriving said first signal from said signal indicative of a desired tension of said recording tape in said first leg and from said signal corresponding to said sensed tension of said recording tape in said first leg.

15. An apparatus as claimed in claim 13, wherein: said means for providing said first signal include means for providing a signal indicative of a desired tension of said recording tape in said first leg, means for providing a signal corresponding to said sensed tension of said recording tape in said first leg, and amplifier means having first input means for receiving said signal indicative of a desired tension of said recording tape in said first leg, negative feedback input means for receiving said signal corresponding to said sensed tension of said recording tape in said first leg as a negative feedback signal, and means for providing an amplifier means output signal as said first signal in response to said signal indicative of a desired tension of said recording tape in said first leg and said negative feedback signal.

16. An apparatus as claimed in claim 13, wherein: said means for controlling said first means include means for selectively modifying said first signal.

17. An apparatus as claimed in claim 15, wherein: said means for controlling said first means include further amplifier means for amplifying said first signal, said further amplifier means including variable feedback means; and said loop tensioning means include means for selectively modifying said variable feedback means.

18. An apparatus as claimed in claim 13, including: means for selectively energizing said second means for rotating said second rotary device; means for sensing tension of said recording tape in said second leg; means for providing a second signal indicative of said sensed tape tension in said second leg; means connected to said means for providing said second signal and to said means for selectively energizing said second means for controlling said second means for rotating said second rotary device with said second signal.

19. In apparatus utilizing an information recording tape wound into a coil the diameter of which changes during utilization of said recording tape, the improvement comprising in combination: means coupled to said recording tape for advancing said recording tape relative to said coil, said advancing means including a capstan for engaging and moving said recording tape; means coupled to said recording tape for maintaining substantially constant tape tension during said coil diameter changes; means for providing a substantially U-shaped tape advance path; means for locating said capstan at a bight portion of said substantially U-shaped tape advance path; means for forming tape from said coil into a substantially U-shaped loop and for placing a bight portion of said U-shaped loop about part of the periphery of said capstan; and means connected to said tape tension means for tensioning said tape during said formation and placement of said U-shaped loop.

20. An apparatus as claimed in claim 19, wherein: said means for maintaining substantially constant tape tension include means for maintaining substantially constant tape tension to one side of said capstan, and means for maintaining substantially constant tape tension to the other side of said capstan, and means for reducing the tension exerted on the tape during said formation and placement of said U-shaped loop.

21. In apparatus utilizing an information recording tape located in tape containing means, the improvement comprising in combination: tape drive means include a tape drive capstan spaced from said tape containing means and initially in spaced relationship to all of said recording tape located in tape containing means; means for moving a length of said recording tape from said tape containing means and from said spaced relationship into engagement with said capstan, said moving means including means for forming said length of recording tape into a loop and placing a portion of said loop into driving engagement with said capstan; and means coupled to said recording tape for tensioning said length of recording tape during said formation and placement of said loop.

22. An apparatus as claimed in claim 21, wherein: said means for moving said recording tape length include means for moving a length of recording tape back into said tape containing means and to said spaced relationship; and said means for tensioning said recording tape length include means for tensioning said recording tape during movement of said length back into said tape containing means and to said spaced relationship.

23. An apparatus as claimed in claim 21, wherein: said means for tensioning said length of recording tape include means coupled to said recording tape to one side of said length of recording tape for tensioning said recording tape length in a first direction, and means coupled to said recording tape to the other side of said length of recording tape for tensioning said recording tape length in a second direction opposite to said first direction.

24. An apparatus as claimed in claim 21, wherein: said means for moving a length of recording tape include means for selectively engaging said recording tape, and means for moving said engaging means relative to said tape containing means.

25. In apparatus utilizing an information recording tape, the improvement comprising in combination: tape drive means including a tape drive capstan for engaging said recording tape said capstan being initially in spaced relationship to all of said tape; means for moving said recording tape from said initial spaced relationship into engagement with said capstan, said moving means including means for forming a length of said recording tape into a loop and placing a portion of said loop into driving engagement with said capstan; means for guiding said engaged recording tape from a first region toward said capstan; means for guiding said engaged recording tape away from said capstan toward a second region; first tensioning means coupled to said recording tape for tensioning said recording tape in a direction away from said capstan and toward said first region; second tensioning means coupled to said recording tape for tensioning said recording tape in a direction away from said capstan and toward said second region; and means connected to said first and second tensioning means for tensioning said tape loop in a direction toward said first region and in a direction toward said second region during said formation and placement of said loop.

26. An apparatus as claimed in claim 25, wherein:

said recording tape has a first end located in said first region and a second end located in said second region;

said first tensioning means and said means connected to said first and second tensioning means include means coupled to said first tape end for moving said first tape end in said first region; and said second tensioning means and said means connected to said first and second tensioning means include means coupled to said second tape end for moving said second tape end in said second region.

27. An apparatus as claimed in claim 26, wherein:

said means coupled to said first tape end include means for winding said recording tape in said first region.

28. An apparatus as claimed in claim 27, wherein:

said means coupled to said second tape end include means for winding said recording tape in said second region.

29. An apparatus as claimed in claim 25, wherein:

said first tensioning means comprise a closed-loop tape tension servo system including said recording tape at said first region.

30. An apparatus as claimed in claim 29, wherein:

said first tensioning means comprise a second closed-loop tape tension servo system including said recording tape at said second region.

31. An apparatus as claimed in claim 30, wherein:

said means for tensioning said recording tape loop include part of said first and second servo systems.

32. In apparatus utilizing an information recording tape located in tape containing means, the improvement comprising in combination:

a tape drive capstan;

means for selectively moving a length of said recording tape out of said tape containing means and into engagement with said capstan;

closed-loop tension control means include said recording tape for controlling the tension of said recording tape, said tension control means include first feedback means and second feedback means and signal input means;

means for providing a first signal indicative of a desired tape tension;

means for applying said first signal to said signal input means of said tension control means;

selectively operable means for providing a second signal indicative of the actual tape tension;

means for applying said second signal to said first feedback means;

means selectively coupled to said moving means for modifying said second feedback means during said movement of said recording tape length; and means for selectively driving said tape drive capstan.

* * * * *

UNITED STATES PATENT OFFICE
CERTIFICATE OF CORRECTION

Patent No. 3,734,426 Dated May 22, 1973

Inventor(s) Peter A. Howes and Eugene A. Cooper

It is certified that error appears in the above-identified patent and that said Letters Patent are hereby corrected as shown below:

Column 2, line 4, "of", second occurrence, should be deleted. Column 2, line 4, --located in tape containing means-- should be inserted after "tape". Column 2, line 5, --tape located in-- should be inserted after "magnetic". Column 2, line 31, a comma (,) should be inserted after "means", first occurrence. Column 3, line 32, a comma (,) should be inserted after "tape". Column 4, line 4, a comma (,) should be inserted after "capstan". Column 4, line 6, --engaged-- should be inserted after "the", first occurrence. Column 4, line 12, a comma (,) should be inserted after "region". Column 5, line 40, should be $$T_1/T_2>e^{\mu\theta}$$

Column 15, line 21, "15" should be --13--. Column 16, line 7, "include" should be --including--.

Signed and sealed this 6th day of August 1974.

(SEAL)
Attest:

McCOY M. GIBSON, JR.
Attesting Officer

C. MARSHALL DANN
Commissioner of Patents